(12) United States Patent
Hu

(10) Patent No.: US 11,789,349 B2
(45) Date of Patent: Oct. 17, 2023

(54) LIGHT SOURCE MODULE

(71) Applicant: DELTA ELECTRONICS, INC., Taoyuan (TW)

(72) Inventor: Chia-Chan Hu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/659,664

(22) Filed: Apr. 19, 2022

(65) Prior Publication Data

US 2022/0390817 A1 Dec. 8, 2022

Related U.S. Application Data

(60) Provisional application No. 63/208,005, filed on Jun. 8, 2021.

(30) Foreign Application Priority Data

Dec. 9, 2021 (CN) .......................... 202111502539.3

(51) Int. Cl.
*G03B 21/20* (2006.01)
*G02B 26/00* (2006.01)
*G03B 21/16* (2006.01)
*G02B 7/00* (2021.01)

(52) U.S. Cl.
CPC ......... *G03B 21/204* (2013.01); *G02B 26/008* (2013.01); *G02B 7/008* (2013.01); *G03B 21/16* (2013.01)

(58) Field of Classification Search
None
See application file for complete search history.

(56) References Cited

U.S. PATENT DOCUMENTS

| 9,442,351 | B2 | 9/2016 | Tsung-Ching et al. |
| 9,664,893 | B2 | 5/2017 | Yamagishi et al. |
| 2017/0351166 | A1* | 12/2017 | Zhao ................... G03B 21/208 |
| 2018/0066835 | A1* | 3/2018 | Kobayashi ........... H04N 9/3161 |

FOREIGN PATENT DOCUMENTS

| CN | 111007688 A | * | 4/2020 | ............. G03B 21/16 |
| CN | 111007688 A | | 4/2020 | |
| TW | 202119117 A | | 5/2021 | |
| WO | 2016121028 A1 | | 8/2016 | |

* cited by examiner

*Primary Examiner* — Bao-Luan Q Le
*Assistant Examiner* — Danell L Owens
(74) *Attorney, Agent, or Firm* — CKC & Partners Co., LLC

(57) ABSTRACT

A light source module includes a light source, a fluorescent ring, a reflector, and a driving device. The light source is configured to emit light. The fluorescent ring has an inner surface. The reflector is configured to reflect the light to form a light spot on the inner surface. The driving device is configured to rotate the reflector to cause the light spot to move along a circular path on the inner surface.

10 Claims, 4 Drawing Sheets

LIGHT SOURCE MODULE

CROSS-REFERENCE TO RELATED APPLICATION

This application claims priority to U.S. Provisional Application Ser. No. 63/208,005 filed Jun. 8, 2021, and China Application Serial Number 202111502539.3, filed Dec. 9, 2021, the disclosures of which are incorporated herein by reference in their entireties.

BACKGROUND

Technical Field

The present disclosure relates to a light source module, and more particularly, to a light source module used in a projector.

Description of Related Art

In recent years, optical projectors have been used in many fields, and the scope of applications is also expanding day by day (e.g., from consumer products to high-tech equipment). Various optical projectors are also widely used in schools, homes and commercial occasions to enlarge the display pattern provided by the signal source and display it on the projection screen.

For the light source configuration of an optical projector, light can be generated by a fluorescent material excited by a solid-state laser light source. In this regard, the fluorescent material can be coated on the wheel, and the motor can be used to drive the wheel to rotate at a high speed, so that energy of the laser light source received by a local part of the fluorescent material in a unit time is reduced, thereby achieving the purpose of heat dissipation. However, as the brightness requirements of optical projectors continue to increase, the heat dissipation requirements for fluorescent materials have become increasingly stringent.

Accordingly, how to provide a light source module that can solve the aforementioned problems becomes an important issue to be solved by those in the industry.

SUMMARY

An aspect of the disclosure is to provide a light source module that can efficiently solve the aforementioned problems.

According to an embodiment of the disclosure, a light source module includes a light source, a fluorescent ring, a reflector, and a driving device. The light source is configured to emit light. The fluorescent ring has an inner surface. The reflector is configured to reflect the light to form a light spot on the inner surface. The driving device is configured to rotate the reflector to cause the light spot to move along a circular path on the inner surface.

In an embodiment of the disclosure, the fluorescent ring includes a ring body and a plurality of fluorescent blocks. The fluorescent blocks are arranged on an inner edge of the ring body along the circular path.

In an embodiment of the disclosure, the ring body has a light-transmitting portion. The light-transmitting portion is communicated with the inner edge and an outer edge of the ring body and arranged between two of the fluorescent blocks.

In an embodiment of the disclosure, the fluorescent ring includes a ring body and a plurality of heat dissipation fins. The heat dissipation fins are disposed on an outer edge of the ring body.

In an embodiment of the disclosure, the light source module further includes a housing. The housing has an enclosed space. The reflector and the fluorescent blocks are located in the enclosed space.

In an embodiment of the disclosure, the ring body constitutes a part of the housing and has an upper opening and a lower opening communicated with each other. The housing further includes a base and a light-transmitting cover. The base covers the lower opening. The light-transmitting cover covers the upper opening and is optically coupled between the light source and the reflector.

In an embodiment of the disclosure, the base is thermally connected to the ring body. The driving device is located in the enclosed space and disposed on the base.

In an embodiment of the disclosure, the light source module further includes a dichroic mirror. The dichroic mirror is optically coupled between the light source and the reflector and configured to reflect a part of the light to the inner surface to form another light spot. The driving device is further configured to rotate the dichroic mirror to cause the another light spot to move along another circular path on the inner surface.

In an embodiment of the disclosure, the fluorescent ring includes a ring body and a plurality of fluorescent blocks. The fluorescent blocks are arranged on an inner edge of the ring body along the another circular path.

In an embodiment of the disclosure, the light spot and the another light spot are respectively located at opposite side of the fluorescent ring.

According to another embodiment of the disclosure, a light source module includes a light source, a fluorescent ring, a reflector, a driving device, and a dichroic mirror. The light source is configured to emit an excitation light along a first direction. The fluorescent ring has an inner surface parallel to the first direction. The reflector is disposed at a center of the fluorescent ring and inclined with respect to the first direction. The reflector is configured to reflect the excitation light in the first direction to cause the excitation light to form a first light spot on the inner surface along a second direction. The driving device is configured to rotate the reflector to cause the first light spot to move along a circular path on the inner surface. The dichroic mirror is obliquely disposed with respect to the first direction and configured to transmit the excitation light and reflect an excited light. The first light spot is used to excite the fluorescent ring to generate the excited light. The excited light is reflected by the reflector to reach the dichroic mirror, and then is reflected by the dichroic mirror to leave the light source module.

In an embodiment of the disclosure, the light source module further includes another dichroic mirror. The another dichroic mirror is obliquely disposed with respect to the first direction, located at the center of the fluorescent ring, and adjacent to the reflector. The another dichroic mirror is configured to reflect a part of the excitation light to the inner surface to form a second light spot and transmit another part of the excitation light to the reflector to form the first light spot. The driving device is configured to rotate the another dichroic mirror and the reflector at the same time, so that the first light spot and the second light spot at different positions on the inner surface move along different circular paths at the same time.

In an embodiment of the disclosure, the fluorescent ring has two circles of fluorescent blocks corresponding to the first light spot and the second light spot respectively. The two circles of fluorescent blocks are configured to convert the excitation light into different color lights. The color lights are reflected by the dichroic mirror to leave the light source module.

Accordingly, in the light source module of the present disclosure, by using the rotating reflector to project the light generated by the light source to the inner surface of the stationary fluorescent ring along a circular path, the fluorescent blocks of the fluorescent ring can be used to generate different color lights, and the color lights can be sequentially guided to an optical engine of a projector via the reflector and other optical elements. Since the fluorescent ring is stationary, heat dissipation structures (e.g., heat dissipation fins, radiators, heat pipes, water cooling systems, etc.) can be flexibly expanded to thermally connect the fluorescent ring, and the heat generated on the fluorescent blocks by the light source can be conducted away faster than the conventional rotating fluorescent wheels. Hence, the light source module of the present disclosure can easily adopt a higher power light source. Not only that, the rotating reflector can operate completely in the enclosed space of the housing partially constituted by the fluorescent ring, so the air dust can be effectively isolated to prevent the surfaces of the reflector and the fluorescent blocks from being contaminated and affecting the excitation efficiency.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
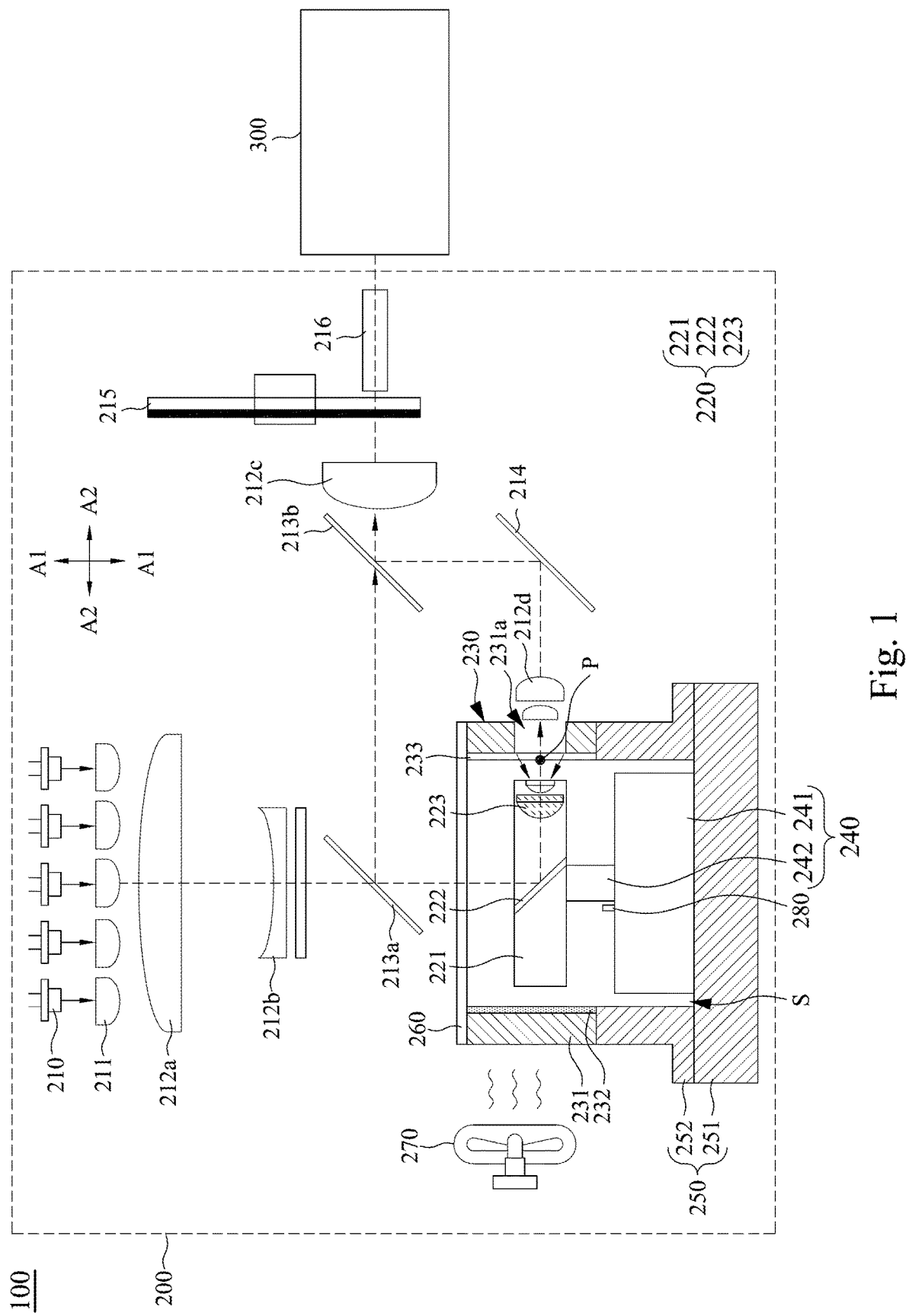
FIG. 1 is a schematic diagram of a light source module and an optical engine in a projector according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram of a light source module 200 and an optical engine 300 in a projector 100 according to an embodiment of the present disclosure. In the present embodiment, the projector 100 includes the light source module 200 and the optical engine 300. The light source module 200 is configured to generate different color lights. The optical engine 300 is configured to process the received color lights into a projection image, and project the projection image to a predetermined position (e.g., a projection screen).

Figure 2:
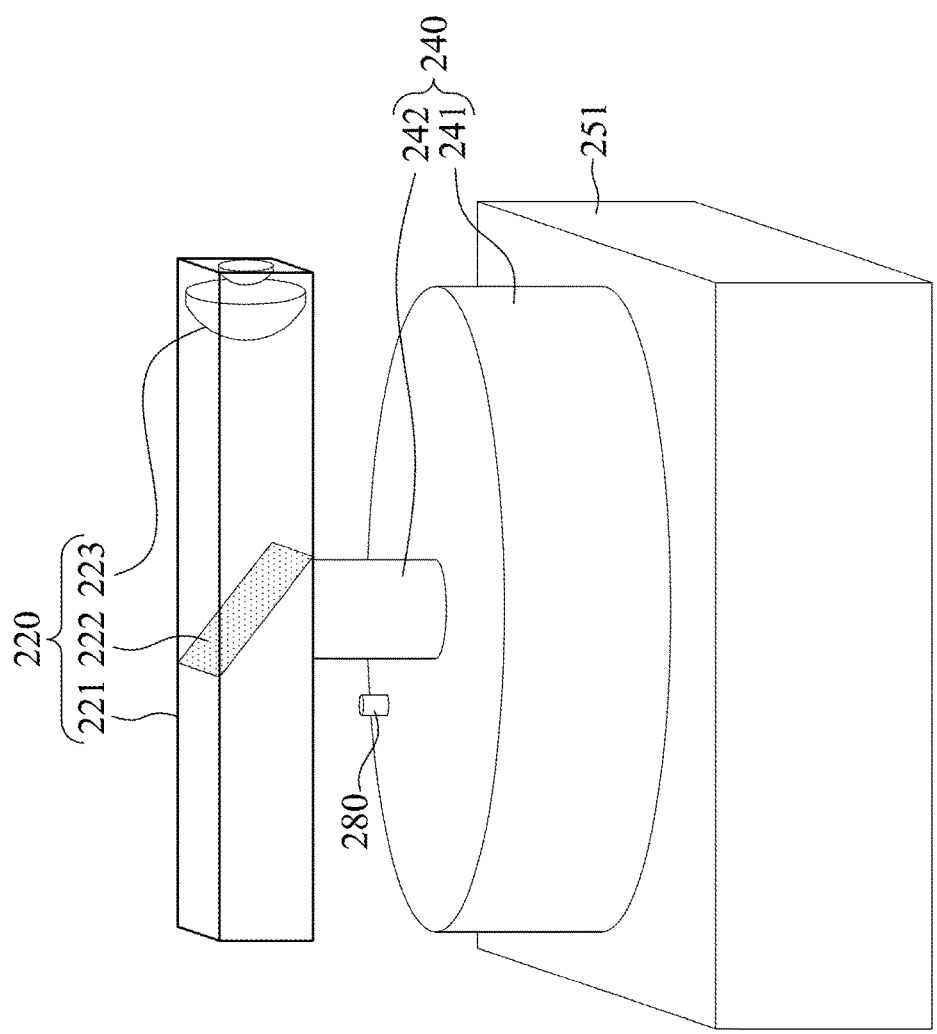
FIG. 2 is a perspective view of some components of the light source module in FIG. 1.
Figure 3:
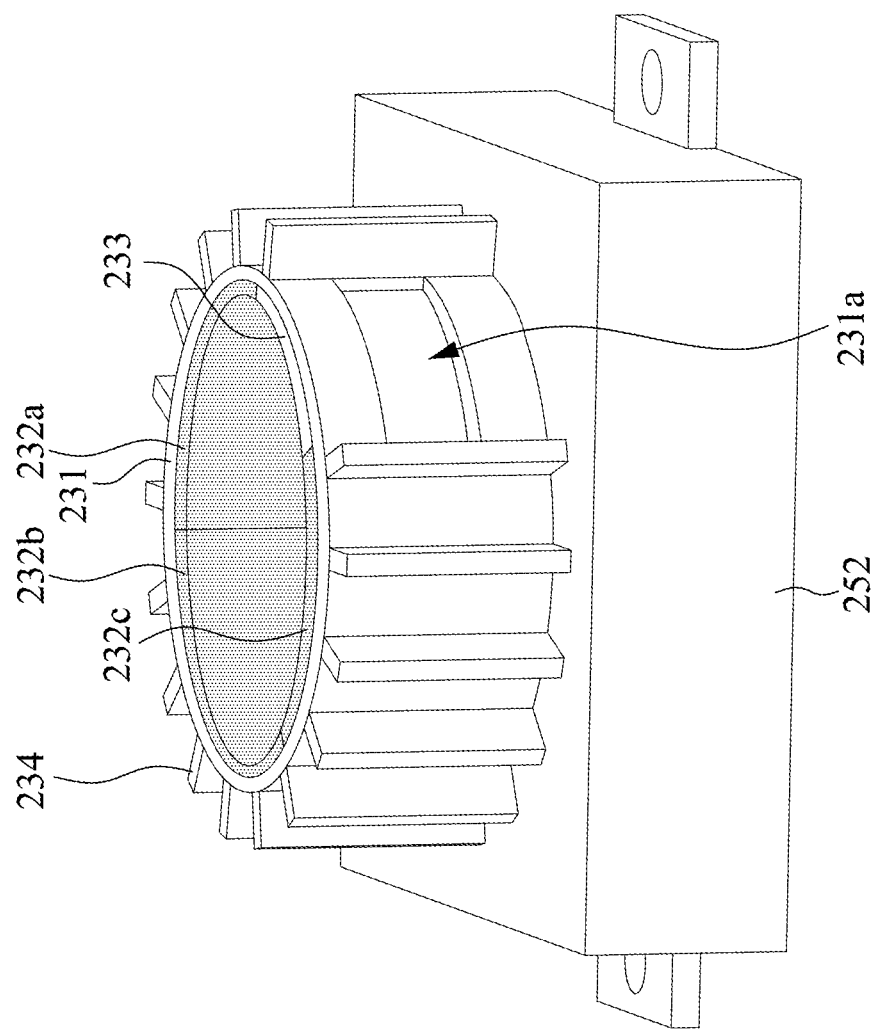
FIG. 3 is another perspective view of some components of the light source module in FIG. 1.

Reference is made to FIGS. 2 and 3. FIG. 2 is a perspective view of some components of the light source module 200 in FIG. 1. FIG. 3 is another perspective view of some components of the light source module 200 in FIG. 1. As shown in FIGS. 1 to 3, in the present embodiment, the light source module 200 includes a plurality of light sources 210, a fluorescent ring 230, a reflector 222, and a driving device 240. The light sources 210 are configured to emit an excitation light along a first direction A1. The fluorescent ring 230 has an inner surface. The inner surface is parallel to the first direction A1. The reflector 222 is disposed at a center of the fluorescent ring 230 and inclined with respect to the first direction A1. The reflector 222 is configured to reflect the excitation light in the first direction A1 to cause the excitation lights to form a light spot P on the inner surface along a second direction A2. The driving device 240 is configured to rotate the reflector 222 to cause the light spot P to move along a circular path on the inner surface. The light spot P is used to excite the fluorescent ring 230 to generate an excited light.

As shown in FIG. 1, in the present embodiment, the light source module 200 further includes a plurality of collimating lenses 211, condenser lenses 212a, 212b, and a dichroic mirror 213a. The collimating lenses 211 are optically coupled with the light sources 210 respectively to collimate the excitation light emitted by the light sources 210. The dichroic mirror 213a is obliquely disposed with respect to the first direction A1 and configured to transmit the excitation light and reflect the excited light converted by the fluorescent ring 230. After passing through the collimating lenses 211, the excitation light emitted by the light sources 210 sequentially passes through the condenser lenses 212a, 212b and the dichroic mirror 213a, and then is incident on the reflector 222 through an upper opening of the fluorescent ring 230. In addition, the excited light converted by the fluorescent ring 230 may be reflected by the reflector 222 and then reach the dichroic mirror 213a, and then be reflected by the dichroic mirror 213a to leave the light source module 200.

In some embodiments, the light sources 210 are, for example, blue semiconductor laser diodes, but the disclosure is not limited in this regard.

As shown in FIG. 2, in the present embodiment, the light source module 200 further includes a platform 251. The driving device 240 is disposed on the platform 251 and includes a motor 241 and a rotating shaft 242. The motor 241 is configured to rotate the rotating shaft 242. The light source module 200 further includes a light guide assembly 220, in which the reflector 222 is included in the light guide assembly 220. The light guide assembly 220 further includes a tube 221 and a plurality of lenses 223. The reflector 222 is obliquely disposed in the tube 221. The lenses 223 are arranged and disposed at one end of the tube 221. The rotating shaft 242 is connected to the tube 221, so the motor 241 can rotate the light guide assembly 220 via the rotating shaft 242. The reflector 222 disposed in the tube 221 is inclined with respect to the rotation axis of the rotating shaft 242 at an angle of 45 degrees, so as to reflect the excitation light incident vertically from above to propagate horizontally.

In some embodiments, a fixing seat (not shown) for fixing the lenses 223 may be provided in the tube 221, or a positioning structure capable of fitting the lenses 223 and the reflector 222 may be provided on the inner wall of the tube 221.

In some embodiments, the light guide assembly 220 may further include a balance weight disposed on the other end of the tube 221 opposite to the lenses 223 so that the center of gravity of the light guide assembly 220 is positioned on the rotation axis of the rotating shaft 242. In this way, the rotating shaft 242 can be prevented from being worn due to the bias, thereby increasing the service life of the driving device 240.

As shown in FIGS. 1 and 3, in the present embodiment, the fluorescent ring 230 includes a ring body 231, a plurality of fluorescent blocks 232 (specifically including fluorescent blocks 232a, 232b, 232c) and a light-transmitting mirror 233. The fluorescent blocks 232a, 232b, 232c and the light-transmitting mirror 233 are arranged on the inner edge of the ring body 231 along a circular path. The fluorescent blocks 232a, 232b, 232c are optical conversion elements, and are configured to convert the excitation light horizontally reflected by the reflector 222 into different color lights. After being collected by the lenses 223, the color lights can be reflected by the reflector 222 to propagate along the original optical path and leave the fluorescent ring 230.

In some embodiments, the fluorescent blocks 232a, 232b, 232c are three curved PIGs (Phosphor-in-Glass), but the disclosure is not limited in this regard. In other embodiments, the fluorescent material may be coated on the ring body 231 and then sintered. The PIGs have characteristics of high heat resistance and high thermal conductivity of inorganic materials. In addition, the phosphor excitation efficiency can be effectively improved by changing the refractive index of the glass.

As shown in FIG. 1, in the present embodiment, the light source module 200 further includes a dichroic mirror 213b, a condenser lens 212c, a color adjustment wheel 215, and an integrating rod 216. The color lights exiting from the upper opening of the ring body 231 are reflected by the dichroic mirror 213a, sequentially pass through the dichroic mirror 213b, the condenser lens 212c, the color adjustment wheel 215, and the integrating rod 216, and finally reach the optical engine 300.

As shown in FIGS. 1 and 3, in the present embodiment, the ring body 231 has a light-transmitting portion 231a. The light-transmitting portion 231a is communicated with the inner edge and an outer edge of the ring body 231 and arranged between two of the fluorescent blocks 232 (specifically the fluorescent blocks 232a, 232c). That is, the light-transmitting portion 231a is opposite to the light-transmitting mirror 233. As shown in FIG. 1, when the light spot P moves to the light-transmitting mirror 233, the excitation light will sequentially pass through the light-transmitting mirror 233 and the light-transmitting portion 231a and leave the fluorescent ring 230.

As shown in FIG. 1, in the present embodiment, the light source module 200 further includes a plurality of condenser lenses 212d and a total reflection mirror 214. After passing through the condenser lenses 212d, the excitation light leaving the fluorescent ring 230 via the light-transmitting portion 231a is sequentially reflected by the total reflection mirror 214 and the dichroic mirror 213b to be guided to the color adjustment wheel 215, and then sequentially passes through the color adjustment wheel 215 and the integrating rod 216 to reach the optical engine 300. In summary, the excitation light emitted by the light sources 210 can form a color light in a time sequence and be reflected to the condenser lens 212c along the above-mentioned optical path, and the excitation light can be transmitted to the condenser lens 212c via the light-transmitting portion 231a in another time sequence. It should be noted that in other embodiments, the light-transmitting portion 231a may not be provided, and the excitation light may be supplemented in the optical path at the rear end. For example, a light source may be additionally provided to be integrated by the dichroic mirror 213b.

As shown in FIG. 3, in the present embodiment, the fluorescent ring 230 further includes a plurality of heat dissipation fins 234. The heat dissipation fins 234 are disposed on an outer edge of the ring body 231 and configured to dissipate the heat generated on the fluorescent blocks 232 by the light sources 210 into the air by means of heat transfer.

As shown in FIG. 1, in the present embodiment, the light source module 200 further includes a fan 270. The fan 270 may generate airflow to quickly take away the heat on the heat dissipation fins 234.

As shown in FIGS. 1 and 3, in the present embodiment, the light source module 200 further includes a ring-shaped heat sink 252. The ring-shaped heat sink 252 is disposed between the platform 251 and the ring body 231 of the fluorescent ring 230, and is configured to quickly conduct the heat generated on the fluorescent blocks 232 by the light sources 210 from the ring body 231 to the platform 251 in a thermally conductive manner.

In some embodiments, the ring-shaped heat sink 252 and the platform 251 may be combined with each other to form a base 250 covering a lower opening of the ring body 231. In some embodiments, the base 250 is a unitary structure (that is, the ring-shaped heat sink 252 and the platform 251 are integrally formed).

In some embodiments, the material of at least one of the ring body 231, the ring-shaped heat sink 252, and the platform 251 of the fluorescent ring 230 includes metal, but the disclosure is not limited in this regard.

Under the foregoing structural configurations, since the fluorescent ring 230 is stationary, heat dissipation structures (e.g., heat dissipation fins, radiators, heat pipes, water cooling systems, etc.) can be flexibly expanded to thermally connect the fluorescent ring 230, and the heat generated on the fluorescent blocks 232 by the light sources 210 can be conducted away faster than the conventional rotating fluorescent wheels.

As shown in FIG. 1, in the present embodiment, the light source module 200 further includes a light-transmitting cover 260. The light-transmitting cover 260 covers the upper opening of the ring body 231 and is optically coupled between the light sources 210 and the reflector 222. Specifically, the light-transmitting cover 260 is located between the dichroic mirror 213a and the light guide assembly 220. The ring body 231 of the fluorescent ring 230, the base 250 assembled by the ring-shaped heat sink 252 and the platform 251, and the light-transmitting cover 260 can form a housing with an enclosed space S. The light guide assembly 220, the fluorescent blocks 232, and the driving device 240 are located in the enclosed space S.

With the foregoing structural configurations, the rotating reflector 222 can operate completely in the enclosed space S, so the air dust can be effectively isolated to prevent the surfaces of the reflector 222 and the fluorescent blocks 232 from being contaminated and affecting the excitation efficiency.

As shown in FIGS. 1 and 2, in the present embodiment, the light source module 200 further includes an optical sensor 280. The optical sensor 280 is disposed in the enclosed space S and configured to detect the rotation speed of the rotating shaft 242. In detail, a mark may be formed on a surface of the rotating shaft 242, and the optical sensor 280 can detect the frequency or period of presence of the mark to know the actual rotation speed of the motor 241, so as to further adjust and control it.

Figure 4:
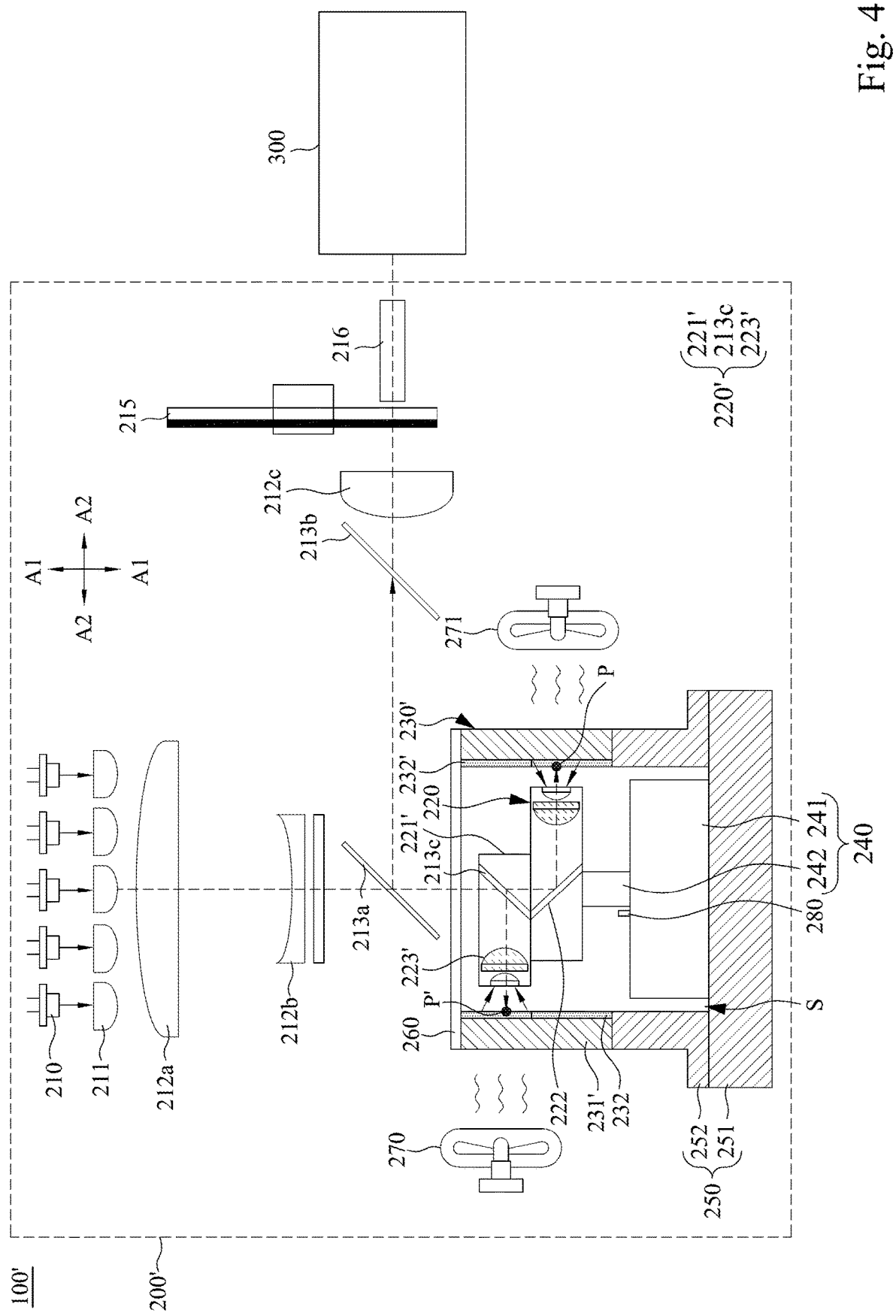
FIG. 4 is a schematic diagram of a light source module and an optical engine in a projector according to another embodiment of the present disclosure.

Reference is made to FIG. 4. FIG. 4 is a schematic diagram of a light source module 200' and an optical engine 300 in a projector 100' according to another embodiment of the present disclosure. The present embodiment is based on the modification of the fluorescent ring 230 in the embodiment shown in FIG. 1. Therefore, the description of other identical components can be referred to the aforementioned related content and will not be repeated here.

As shown in FIG. 4, in the present embodiment, the light source module 200' further includes another light guide assembly 220'. The light guide assembly 220' includes a tube 221', a dichroic mirror 213c, and a plurality of lenses 223'. The light guide assembly 220' is located within the inner surface of the fluorescent ring 230', and is fixed on a side of the light guide assembly 220' away from the rotating shaft 242. The dichroic mirror 213c is disposed in the tube 221' obliquely with respect to the first direction A1, and is located in the center of the fluorescent ring 230' and adjacent to the reflector 222. The lenses 223' are arranged and disposed at one end of the tube 221'. The motor 241 can simultaneously rotate the light guide assemblies 220, 220' via the rotating shaft 242. The dichroic mirror 213c disposed in the tube 221' can be inclined at an angle of 45 degrees with respect to the rotation axis of the rotating shaft 242, so as to horizontally reflect a part of the excitation light incident vertically from above to the inner surface of the fluorescent ring 230', and allow another part of the excitation light to pass through and reach the reflector 222 below (i.e., the dichroic mirror 213c is optically coupled between the light sources 210 and the reflector 222). The excitation light reflected by the dichroic mirror 213c will form another light spot P' on the inner surface of the fluorescent ring 230', and the rotated light guide assembly 220' will cause the light spot P' to move on the inner surface along another circular path. At this time, the light source module 200' will form two light spots P, P' at different height positions on the inner surface of the fluorescent ring 230' and move along the different circular paths respectively at the same time.

In addition, the fluorescent ring 230' further includes a plurality of fluorescent blocks 232'. The fluorescent blocks 232' are arranged on the inner surface of the ring body 231' along the aforementioned another circular path. In other words, the fluorescent ring 230' of the present embodiment has two circles of fluorescent blocks 232, 232' arranged up and down. The fluorescent blocks 232' are configured to convert the excitation light horizontally reflected by the dichroic mirror 213c into different color lights. The color lights can be reflected by the dichroic mirror 213c to propagate along the original optical path and exit from the upper opening of the ring body 231'. The color lights exiting from the upper opening of the ring body 231' are reflected by the dichroic mirror 213a, sequentially pass through the dichroic mirror 213b, the condenser lens 212c, the color adjustment wheel 215, and the integrating rod 216, and finally reach the optical engine 300.

As shown in FIG. 4, in the present embodiment, the light spots P, P' are respectively located on opposite sides of the fluorescent ring 230'. Hence, the heat energy generated on the fluorescent ring 230' by the light sources 210 can be more evenly dispersed.

Compared with the embodiment shown in FIG. 1, in the fluorescent ring 230' of the present embodiment, the light-transmitting mirror 233 is omitted, the ring body 231' does not have the light-transmitting portion 231a, and the corresponding condenser lenses 212d and the total reflection mirror 214 are also omitted. In addition, the light source module 200' of the present embodiment further includes another fan 271. The two fans 270, 271 are respectively located on opposite sides of the fluorescent ring 230', and can generate airflow to quickly take away the heat on the heat dissipation fins 234.

According to the foregoing recitations of the embodiments of the disclosure, it can be seen that in the light source module of the present disclosure, by using the rotating reflector to project the light generated by the light source to the inner surface of the stationary fluorescent ring along a circular path, the fluorescent blocks of the fluorescent ring can be used to generate different color lights, and the color lights can be sequentially guided to an optical engine of a projector via the reflector and other optical elements. Since the fluorescent ring is stationary, heat dissipation structures (e.g., heat dissipation fins, radiators, heat pipes, water cooling systems, etc.) can be flexibly expanded to thermally connect the fluorescent ring, and the heat generated on the fluorescent blocks by the light source can be conducted away faster than the conventional rotating fluorescent wheels. Hence, the light source module of the present disclosure can easily adopt a higher power light source. Not only that, the rotating reflector can operate completely in the enclosed space of the housing partially constituted by the fluorescent ring, so the air dust can be effectively isolated to prevent the surfaces of the reflector and the fluorescent blocks from being contaminated and affecting the excitation efficiency.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A light source module, comprising:
   a light source configured to emit light;
   a fluorescent ring having an inner surface and comprising:
     a ring body; and
     a plurality of fluorescent blocks arranged on an inner edge of the ring body along a circular path;
   a reflector configured to reflect the light to form a light spot on the inner surface;
   a driving device configured to rotate the reflector to cause the light spot to move along the circular path on the inner surface;
   a housing having an enclosed space, the reflector and the fluorescent blocks being located in the enclosed space, wherein the ring body constitutes a part of the housing and has an upper opening and a lower opening communicated with each other, and the housing further comprises:
a base covering the lower opening; and
a light-transmitting cover covering the upper opening and optically coupled between the light source and the reflector.

2. The light source module of claim 1, wherein the ring body has a light-transmitting portion, and the light-transmitting portion is communicated with the inner edge and an outer edge of the ring body and arranged between two of the fluorescent blocks.

3. The light source module of claim 1, wherein the fluorescent ring further comprises a plurality of heat dissipation fins disposed on an outer edge of the ring body.

4. The light source module of claim 1, wherein the base is thermally connected to the ring body, and the driving device is located in the enclosed space and disposed on the base.

5. The light source module of claim 1, further comprising a dichroic mirror, the dichroic mirror being optically coupled between the light source and the reflector and configured to reflect a part of the light to the inner surface to form another light spot, wherein the driving device is further configured to rotate the dichroic mirror to cause the another light spot to move along another circular path on the inner surface.

6. The light source module of claim 5, wherein the fluorescent ring comprises a plurality of fluorescent blocks arranged on an inner edge of the ring body along the another circular path.

7. The light source module of claim 5, wherein the light spot and the another light spot are respectively located at opposite side of the fluorescent ring.

8. A light source module, comprising:
a light source configured to emit an excitation light along a first direction;
a fluorescent ring having an inner surface parallel to the first direction;
a reflector disposed at a center of the fluorescent ring and inclined with respect to the first direction, the reflector being configured to reflect the excitation light in the first direction to cause the excitation light to form a first light spot on the inner surface along a second direction;
a driving device configured to rotate the reflector to cause the first light spot to move along a circular path on the inner surface; and
a dichroic mirror obliquely disposed with respect to the first direction and configured to transmit the excitation light and reflect an excited light,
wherein the first light spot is used to excite the fluorescent ring to generate the excited light, the excited light is reflected by the reflector to reach the dichroic mirror, and then is reflected by the dichroic mirror to leave the light source module.

9. The light source module of claim 8, further comprising another dichroic mirror, the another dichroic mirror being obliquely disposed with respect to the first direction, located at the center of the fluorescent ring, and adjacent to the reflector, the another dichroic mirror being configured to reflect a part of the excitation light to the inner surface to form a second light spot and transmit another part of the excitation light to the reflector to form the first light spot, wherein the driving device is configured to rotate the another dichroic mirror and the reflector at the same time, so that the first light spot and the second light spot at different positions on the inner surface move along different circular paths at the same time.

10. The light source module of claim 9, wherein the fluorescent ring has two circles of fluorescent blocks corresponding to the first light spot and the second light spot respectively, the two circles of fluorescent blocks are configured to convert the excitation light into different color lights, and the color lights are reflected by the dichroic mirror to leave the light source module.

* * * * *